(12) United States Patent
Hirai

(10) Patent No.: US 10,473,231 B2
(45) Date of Patent: Nov. 12, 2019

(54) FLOW RATE ADJUSTMENT DEVICE

(71) Applicant: Surpass Industry Co., Ltd., Gyoda-shi, Saitama (JP)

(72) Inventor: Kazuki Hirai, Saitama (JP)

(73) Assignee: Surpass Industry Co., Ltd., Gyoda-shi, Saitama (JP)

( * ) Notice: Subject to any disclaimer, the term of this patent is extended or adjusted under 35 U.S.C. 154(b) by 0 days.

(21) Appl. No.: 15/493,648

(22) Filed: Apr. 21, 2017

(65) Prior Publication Data

US 2017/0314687 A1 Nov. 2, 2017

(30) Foreign Application Priority Data

Apr. 27, 2016 (JP) .................................. 2016-088983

(51) Int. Cl.
*F16K 31/50* (2006.01)
*F16K 7/14* (2006.01)
*F16K 7/16* (2006.01)
*F16K 3/12* (2006.01)

(52) U.S. Cl.
CPC ............. *F16K 31/508* (2013.01); *F16K 3/12* (2013.01); *F16K 7/14* (2013.01); *F16K 7/16* (2013.01)

(58) Field of Classification Search
CPC ... F16K 1/38; F16K 1/385; F16K 7/12; F16K 7/123; F16K 7/126; F16K 7/14; F16K 7/16; F16K 31/508; F16K 27/0236; F16K 27/0254
USPC ........................................ 251/331, 333, 334
See application file for complete search history.

(56) References Cited

U.S. PATENT DOCUMENTS

| 1,121,825 | A |   | 12/1914 | Gray |
| 1,499,433 | A | * | 7/1924 | Williston ................ F16K 1/385 |
|           |   |   |         | 138/46 |
| 2,540,371 | A | * | 2/1951 | Oystein .................... F16K 7/16 |
|           |   |   |         | 251/267 |
| 2,763,322 | A |   | 9/1956 | Eichelman |
| 2,891,763 | A | * | 6/1959 | Fortune ................... F16K 41/10 |
|           |   |   |         | 251/333 |

(Continued)

FOREIGN PATENT DOCUMENTS

| CN | 103206552 A | 7/2013 |
| DE | 102008039200 A1 | 2/2010 |

(Continued)

OTHER PUBLICATIONS

Extended European Search Report dated Sep. 6, 2017 for European Patent Application No. 17167406.2.

(Continued)

*Primary Examiner* — Reinaldo Sanchez-Medina
*Assistant Examiner* — David Colon-Morales
(74) *Attorney, Agent, or Firm* — Muncy, Geissler, Olds & Lowe, P.C.

(57) ABSTRACT

Provided is a flow rate adjustment device including: a diaphragm integrated valve body; a valve seat section provided around an inflow opening and including a valve seat surface disposed at a position facing a valve surface; and a transfer mechanism configured to cause the diaphragm integrated valve body to move along an axis line to adjust a distance between the valve surface and the valve seat surface. The valve surface 11a and the valve seat surface form an angle, which is an acute angle, with the axis line and are disposed in parallel.

6 Claims, 9 Drawing Sheets

(56) References Cited

U.S. PATENT DOCUMENTS

| | | | | |
|---|---|---|---|---|
| 2,936,776 | A | * | 5/1960 | Veatch ................ F16K 27/0272 137/375 |
| 3,648,727 | A | | 3/1972 | Huyck |
| 3,979,105 | A | * | 9/1976 | Pool ........................ F16K 1/385 251/121 |
| 4,180,239 | A | * | 12/1979 | Valukis .................. F16K 21/16 251/205 |
| 4,222,406 | A | | 9/1980 | Schaefer |
| 4,860,793 | A | * | 8/1989 | Hartl ........................ F16K 1/14 137/606 |
| 4,968,003 | A | * | 11/1990 | Danko ...................... F16K 7/16 251/239 |
| 5,002,086 | A | | 3/1991 | Linder et al. |
| 6,230,738 | B1 | * | 5/2001 | Watanabe ............. F16K 31/004 137/486 |
| 6,685,164 | B1 | * | 2/2004 | Koizumi .................. F16K 1/302 251/331 |
| 6,786,470 | B2 | * | 9/2004 | Newberg ............. F16K 31/508 251/331 |
| 7,337,805 | B2 | * | 3/2008 | Brown ...................... F16K 7/14 137/625.33 |
| 7,537,194 | B2 | | 5/2009 | Nagai |
| 7,703,743 | B2 | * | 4/2010 | Muramatsu ........... F04B 7/0076 251/129.11 |
| 7,712,484 | B2 | * | 5/2010 | Fukano ................ B05B 12/149 137/606 |
| 8,292,262 | B2 | * | 10/2012 | Hasunuma ................ F16K 7/12 137/513.3 |
| 2001/0040230 | A1 | | 11/2001 | Yoo et al. |
| 2002/0056819 | A1 | | 5/2002 | Contin et al. |
| 2005/0224744 | A1 | * | 10/2005 | Newberg .................. F16K 1/36 251/331 |
| 2009/0072173 | A1 | | 3/2009 | Hasunuma et al. |
| 2011/0291037 | A1 | | 12/2011 | Hasunuma |
| 2012/0132839 | A1 | * | 5/2012 | Moren ...................... F16K 1/04 251/205 |
| 2015/0369379 | A1 | * | 12/2015 | Smith .................. F16K 41/103 137/494 |

FOREIGN PATENT DOCUMENTS

| | | |
|---|---|---|
| EP | 2 416 039 A1 | 2/2012 |
| EP | 2944849 A1 | 11/2015 |
| GB | 2109508 A | 6/1983 |
| JP | S5557766 A | 4/1980 |
| JP | H10-299913 A | 11/1998 |
| JP | H1130353 A | 2/1999 |
| JP | 2008008415 A | 1/2008 |
| JP | 2011-247378 A | 12/2011 |
| WO | WO0140692 A1 | 6/2001 |
| WO | WO0227222 A1 | 4/2002 |
| WO | WO2007001162 A1 | 1/2007 |
| WO | WO2013169142 A1 | 11/2013 |
| WO | WO2015/155407 A1 | 10/2015 |

OTHER PUBLICATIONS

European Office Action dated Aug. 22, 2018 in corresponding application 17167406.2.
European Office Action dated May 17, 2019 in corresponding application 17167406.2.
Japanese Office Action dated Oct. 1, 2019 in corresponding application JP2016-088983.

* cited by examiner

FLOW RATE ADJUSTMENT DEVICE

CROSS-REFERENCE TO RELATED APPLICATIONS

This application is based on Japanese Patent Application No. 2016-088983, the contents of which are incorporated herein by reference in its entirety.

TECHNICAL FIELD

The present disclosure relates to a flow rate adjustment device.

BACKGROUND ART

A flow rate adjustment device that adjusts a flow rate of liquid by changing the amount of intrusion of a needle valve body to a fluid-flow-path outlet that is opened to a valve seat has been conventionally known (e.g., see Japanese Unexamined Patent Application, Publication No. 2011-247378 (hereinafter referred to as "JP 2011-247378")).

In the flow rate adjustment device disclosed in JP 2011-247378, a reciprocating movement section is installed in a casing provided with the fluid-flow-path outlet, and the reciprocating movement section converts rotational movement of a motor into vertical movement to thereby change the amount of intrusion of the needle valve body to the fluid-flow-path outlet.

SUMMARY

Technical Problem

When the flow rate adjustment device disclosed in JP 2011-247378 is assembled, it is necessary to install the reciprocating movement section in the casing. In this case, if the center axis of the fluid-flow-path outlet that is opened to the valve seat is accurately matched with the central axis of the needle valve body, the needle valve body and the fluid-flow-path outlet are not brought into contact with each other when the needle valve body vertically moves.

However, if the positioning accuracy and the dimension accuracy of each component when the reciprocating movement section is installed in the casing are not sufficient, the center axis of the fluid-flow-path outlet does not match the center axis of the needle valve body. In this case, when the needle valve body vertically moves, the needle valve body and the fluid-flow-path outlet are brought into contact with each other, so that a part of the material forming the needle valve body and the fluid-flow-path outlet may be discharged as particles. The particles are contaminated in the fluid as impurities, which makes it difficult to maintain a high purity of the fluid. In particular, when a liquid having high purity, such as drug solution or pure water for semiconductor manufacturing devices, is treated as the fluid, the problem of particles becomes noticeable.

Note that the problem of particles can be prevented by employing a valve body including a planar bottom surface in place of the needle valve body that intrudes into the fluid-flow-path outlet.

However, the valve body including the planar bottom surface is employed, the amount of change in the flow rate of the fluid with respect to the amount of movement of the valve body is extremely large, which makes it difficult to accurately adjust the flow rate of the fluid.

The present disclosure has been made in view of the above-mentioned circumstances, and an object of the present disclosure is to provide a flow rate adjustment device capable of suppressing the generation of particles when an assembly error or a dimension error occurs in members constituting a valve body section and members constituting a valve seat section and accurately adjusting a flow rate of a fluid.

Solution to Problem

The present disclosure employs the following solutions to solve the above-mentioned problems.

A flow rate adjustment device according to one aspect of the present disclosure includes: a valve body section configured to move along an axis line within a valve chest and including a valve surface; a valve seat section provided around a flow path opening and including a valve seat surface disposed at a position facing the valve surface, the flow path opening allowing the valve chest and an internal flow path to communicate with each other; and a transfer mechanism coupled to the valve body section and configured to cause the valve body section to move along the axis line to adjust a distance between the valve surface and the valve seat surface. The valve surface and the valve seat surface form an acute angle with the axis line and are disposed in parallel.

In the flow rate adjustment device according to one aspect of the present disclosure, the transfer mechanism adjusts the distance between the valve surface of the valve body section and the valve seat surface of the valve seat section along the axis line, thereby adjusting the flow rate of the fluid. The valve surface disposed so as to face the valve seat surface has a planar shape. Accordingly, even when an assembly error or a dimension error occurs in members constituting the valve body section and members constituting the valve seat section, the valve surface is not inserted into the flow path opening, but instead is disposed in proximity to the valve seat surface provided around the flow path opening. This makes it possible to suppress the generation of particles when an assembly error or a dimension error occurs in the members constituting the valve body section and the members constituting the valve seat section.

In the flow rate adjustment device according to one aspect of the present disclosure, the valve surface and the valve seat surface form an acute angle with the axis line and are disposed in parallel. Accordingly, a variation in the distance between the valve surface and the valve seat surface is relatively smaller than a variation in the distance of movement of the valve body section along the axis line by the transfer mechanism. Thus, a minimum movement amount of the distance between the valve surface and the valve seat surface is smaller than a minimum movement amount that can be adjusted by the transfer mechanism, which makes it possible to accurately adjust the flow rate of the fluid.

In the flow rate adjustment device according to one aspect of the present disclosure, the valve surface and the valve seat surface may be surfaces having a planar shape.

With this structure, even when an assembly error or a dimension error occurs in the members constituting the valve body section and the members constituting the valve seat section, the state in which the valve surface and the valve seat surface each having a planar shape are disposed in parallel is maintained, thereby reliably suppressing the generation of particles.

In the flow rate adjustment device having the structure described above, the length of a line of intersection between a plane orthogonal to the axis line and the valve seat surface is preferably longer than the length of a line of intersection between the plane and the valve surface.

This structure makes it possible to suppress a malfunction that when an assembly error occurs in the members constituting the valve body section and the members constituting the valve seat section, the position of the valve surface varies due to the error and the valve surface contacts a section other than the valve seat surface.

In the flow rate adjustment device according to one aspect of the present disclosure, the valve surface and the valve seat surface may be formed in a shape matching a conical surface with the axis line as a center axis.

With this structure, even when an error occurs between the rotational position about the axis line of the valve seat section and the rotational position about the axis line of the valve body section, the state in which the conical surfaces face each other can be maintained and the state in which the distance between the valve surface and the valve seat surface is constant can be maintained.

The flow rate adjustment device according to one aspect of the present disclosure may have a structure in which the valve body section and the transfer mechanism are coupled through a shaft-like member extending along the axis line; the valve body section is formed of a fluorine resin material; and the shaft-like member is formed of a material having hardness higher than that of the fluorine resin material.

With this structure, the valve body section can be formed of a fluorine resin material having a high chemical resistance, and the shaft-like member formed of a material having hardness higher than that of the fluorine resin material allows the valve body section to be firmly coupled to the transfer mechanism.

In the flow rate adjustment device according to one aspect of the present disclosure, the valve body section may include: a base including the valve surface; a thin film section coupled to an outer peripheral surface of the base and formed in an annular shape about the axis line; and an annular section including an inner peripheral surface coupled to the thin film section and formed in an annular shape. The valve seat section may be provided on a main body section having the internal flow path formed therein. The annular section may be regulated in such a manner that the annular section is prevented from being rotated about the axis line by a rotation preventing member that is inserted into the main body section.

With this structure, the rotational position about the axis line of the annular section and the rotational position about the axis line of the valve seat section are accurately regulated so that the rotational positions have a desired positional relationship. Accordingly, the rotational position about the axis line of the valve surface of the base coupled to the annular section through the thin film section is accurately regulated so that the rotational position is set at a desired position, thereby accurately achieving the state in which the valve surface and the valve seat surface are disposed in parallel.

Advantageous Effects

According to the present disclosure, it is possible to provide a flow rate adjustment device capable of suppressing the generation of particles when an assembly error or a dimension error occurs in members constituting a valve body section and members constituting a valve seat section and accurately adjusting a flow rate of a fluid.

DESCRIPTION OF EMBODIMENTS

First Embodiment

A flow rate adjustment device 100 according to a first embodiment of the present invention will be described below with reference to the drawings.

The flow rate adjustment device 100 according to this embodiment is a device which adjusts a flow rate of a fluid that flows in from an inflow port 100*a*, circulates through an internal flow path, and flows out from an outflow port 100*b*.

The fluid whose flow rate is adjusted by the flow rate adjustment device 100 according to this embodiment is, for example, a liquid such as drug solution or pure water used for semiconductor manufacturing devices. Assume that the temperature of the fluid is, for example, a temperature in an ordinary temperature range (e.g., 10° C. or higher and lower than 50° C.)

Figure 1:
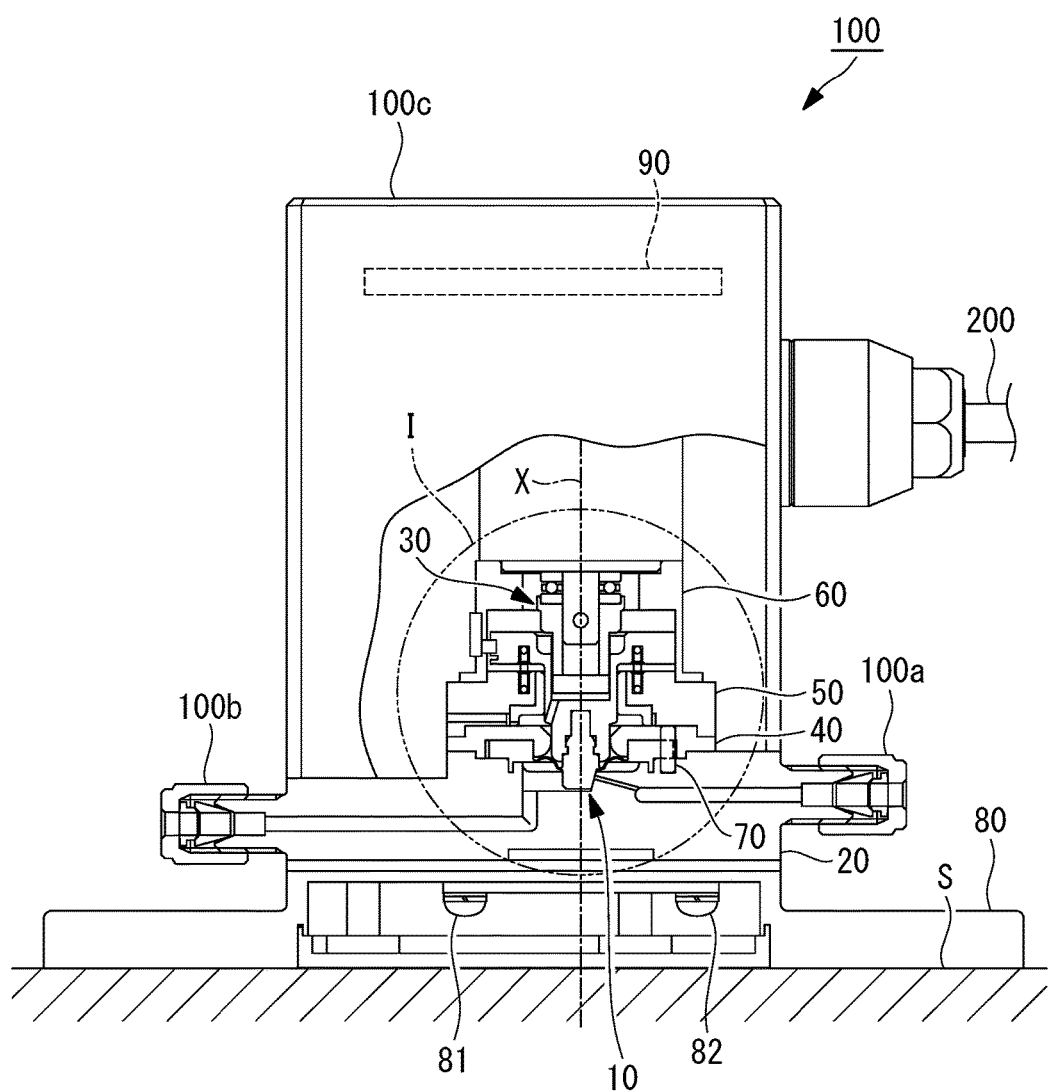
FIG. 1 is a partial longitudinal sectional view showing a flow rate adjustment device according to a first embodiment.

As shown in FIG. 1, the flow rate adjustment device 100 according to this embodiment includes a diaphragm integrated valve body (valve body section) 10; a main body section 20 including an internal flow path; a transfer mechanism 30 that causes the diaphragm integrated valve body 10 to move along an axis line X; a fixing member 40 that fixes the diaphragm integrated valve body 10 to the main body section 20; a support section 50 that supports the diaphragm integrated valve body 10 in such a manner that the diaphragm integrated valve body 10 moves along the axis line X; a motor support member 60 that supports a stepping motor (drive section) 31 included in the transfer mechanism 30; a rotation preventing pin 70; a base section 80 that is installed on an installation surface S; and a control board (control section) 90 that controls the transfer mechanism 30.

As shown in FIG. 1, the diaphragm integrated valve body 10, the transfer mechanism 30, the fixing member 40, the support section 50, the motor support member 60, the rotation preventing pin 70, and the control board 90 are accommodated in a cover member 100*c* which is installed above the main body section 20. The control board 90 transmits various signals to an external device (not shown)

and receives various signals therefrom via a cable 200, and is supplied with power from the external device.

The main body section 20, the fixing member 40, the support section 50, the motor support member 60, and the base section 80 are fastened with fastening bolts 81 and 82, which extend along the axis line X, and thus integrally formed.

Each section of the flow rate adjustment device 100 according to this embodiment will be described below.

The diaphragm integrated valve body 10 moves along the axis line X within a valve chest R1, and adjusts the flow rate of the fluid flowing into the valve chest R1 from an introduction flow path 22 which is provided in the valve seat section 21. A distance between the diaphragm integrated valve body 10 and the valve seat section 21 is adjusted by the transfer mechanism 30 which is described later.

Figure 2:
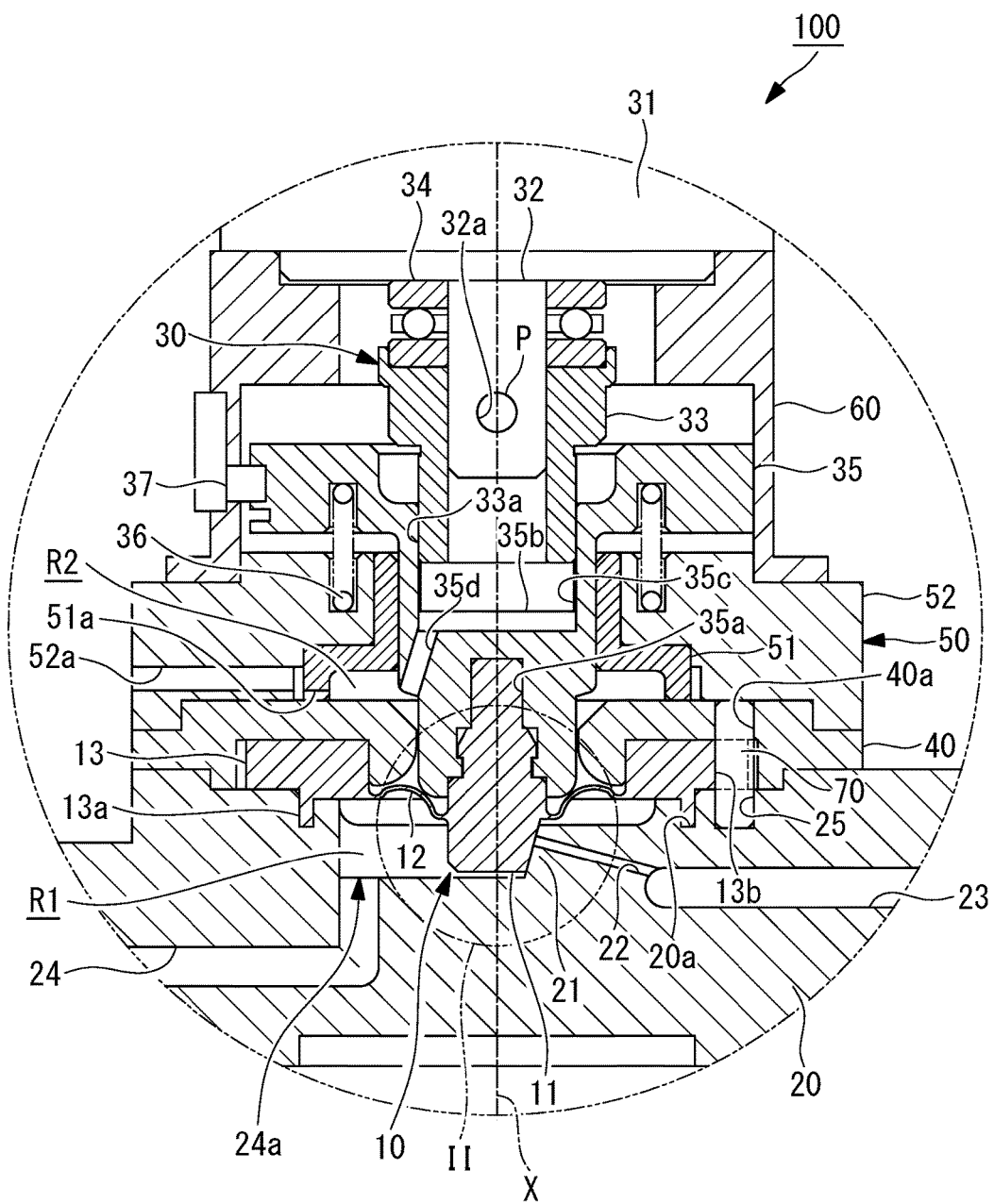
FIG. 2 is a partial enlarged value showing a part I of the flow rate adjustment device shown in FIG. 1.

As shown in FIG. 2, the diaphragm integrated valve body 10 includes a base 11 which is formed in a shaft-like shape along the axis line X; a diaphragm section (thin film section) 12 which is coupled to an outer peripheral surface of the base 11 and is formed in an annular shape about the axis line X and in a thin film shape; and an annular section 13 which includes an inner peripheral surface coupled to an outer peripheral end of the diaphragm section 12 and is formed in an annular shape.

The base 11, the diaphragm section 12, and the annular section 13 are integrally formed of a single material. As the material forming the diaphragm integrated valve body 10, a fluorine resin material having a high chemical resistance, such as PTFE (polytetrafluoroethylene), is desirably used.

The annular section 13 is formed in an endless manner along the circumferential direction about the axis line X and is provided with an annular protrusion 13a which protrudes downward along the axis line X. On the other hand, the main body section 20, which is disposed at a position facing the diaphragm integrated valve body 10, is provided with an annular groove section 20a which is formed in an endless manner along the circumferential direction about the axis line X and is opened upward along the axis line X. The annular protrusion 13a and the annular groove section 20a are formed so as to have the same radius with respect to the axis line X.

When the flow rate adjustment device 100 according to this embodiment is assembled, the annular protrusion 13a of the diaphragm integrated valve body 10 is press-fit into the annular groove section 20a of the main body section 20. This allows the annular groove section 20a and the annular protrusion 13a to be brought into close contact with each other, and a region in which the annular groove section 20a and the annular protrusion 13a are in close contact with each other becomes a seal region that prevents the fluid from flowing to the outside from the valve chest R1. The center axis of the base 11 of the diaphragm integrated valve body 10 matches the axis line of the base 11. The diaphragm integrated valve body 10 is fixed to the main body section 20, thereby forming the valve chest R1 that is partitioned by the diaphragm integrated valve body 10 and the main body section 20.

As shown in FIG. 2, the main body section 20 includes: the valve seat section 21 disposed at a position facing the diaphragm integrated valve body 10; the introduction flow path (internal flow path) 22 that introduces the fluid flowing in from the inflow port 100a to the valve chest R1; an inflow path 23 that circulates the fluid flowing in from the inflow port 100a and guides the fluid to the introduction flow path 22; and an outflow path 24 that guides the fluid flowing out of the valve chest R1 to the outflow port 100b from an outflow opening 24a.

The main body section 20 is formed integrally with a single material. As the material forming the main body section 20, a fluorine resin material having a high chemical resistance, such as PTFE (polytetrafluoroethylene), is desirably used.

The transfer mechanism 30 is a mechanism that causes the diaphragm integrated valve body 10 to move along the axis line X to adjust the distance between the diaphragm integrated valve body 10 and the valve seat section 21 of the main body section 20, thereby adjusting the flow rate of the fluid to be guided to the valve chest R1 from the introduction flow path 22.

As shown in FIG. 2, the transfer mechanism 30 includes the stepping motor (drive section) 31; a drive shaft 32 which is coupled to the stepping motor 31 and rotated about the axis line X; a rotary member 33 which is rotated integrally with the drive shaft 32; a thrust bearing section 34 which is disposed so as to surround the drive shaft 32; a movable member 35 which is relatively movable along the axis line X relative to the rotary member 33; a spring 36 that is disposed between the movable member 35 and the support section 50; and a position detection section 37. The drive shaft 32, the rotary member 33, the thrust bearing section 34, and the movable member 35 are each formed of a metallic material (e.g., stainless steel such as SUS304, carbon steel such as S45C, or carbon tool steel such as SK4).

The stepping motor 31 is a drive mechanism that causes the drive shaft 32 to rotate according to the number of pulses included in a rectangular pulse signal transmitted from the control board 90.

As shown in FIG. 2, the drive shaft 32 is provided with a through-hole 32a that penetrates in the horizontal direction orthogonal to the axis line X. The rotary member 33 is also provided with a through-hole (not shown) that penetrates in the horizontal direction orthogonal to the axis line X. A pin P is inserted into the through-hole 32a of the drive shaft 32 and the through-hole of the rotary member 33, so that the rotary member 33 is rotated about the axis line X integrally with the drive shaft 32.

As shown in FIG. 2, the rotary member 33 is a member formed in a cylindrical shape extending along the axis line X, and a male screw 33a is provided on an outer peripheral surface of the lower half of the rotary member 33. The male screw 33a is provided so as to couple the rotary member 33 to the movable member 35 and cause the movable member 35 to move relatively to the rotary member 33.

The thrust bearing section 34 is disposed between the rotary member 33 and the stepping motor 31 so as to surround the drive shaft 32. The thrust bearing section 34 supports an urging force of the spring 36 and an upward urging force that is received by the diaphragm integrated valve body 10 from the fluid along the axis line X, and causes the rotary member 33 to smoothly rotate without depending on the urging forces.

The movable member 35 is a member disposed along the axis line X. At a lower end of the movable member 35, an insertion hole 35a into which the base 11 of the diaphragm integrated valve body 10 is inserted is formed. At an upper end of the movable member 35, a coupling hole 35b to be coupled to the rotary member 33 is formed.

As shown in FIG. 2, the upper half of the base 11 of the diaphragm integrated valve body 10 is inserted into the insertion hole 35a of the movable member 35. When the upper half of the base 11 is inserted into the insertion hole 35a, the base 11 which is formed of a fluorine resin material is elastically deformed and brought into the coupled state as shown in FIG. 2.

A female screw 35c which is coupled to the male screw 33a of the rotary member 33 is provided on the inner peripheral surface of the coupling hole 35b of the movable member 35. The female screw 35c is provided so as to couple the movable member 35 to the rotary member 33 and cause the movable member 35 to move relatively to the rotary member 33.

At an outer peripheral part of the upper part of the movable member 35, through-holes (not shown) each extending in the direction parallel to the axis line X are formed at a plurality of positions (e.g., three positions at intervals of) 120° about the axis line X. In each of the through-holes, a rod-like rotation preventing member (not shown) for regulating the rotation of the movable member 35 about the axis line X is inserted. A lower end of the rotation preventing member is inserted into an insertion hole (not shown) that is formed in the upper surface of the second support member 52. The lower end of the rotation preventing member is inserted into the insertion hole, thereby regulating the rotation of the movable member 35 about the axis line X.

As shown in FIG. 2, the movable member 35 is provided with a ventilation hole 35d that allows a space formed below the coupling hole 35b to communicate with a space R2 that communicates with the outside. The ventilation hole 35d is a hole for maintaining the space formed below the coupling hole 35b in an atmospheric pressure state regardless of a positional displacement of the movable member 35 relative to the rotary member 33.

The spring 36 is a member that is inserted into the annular groove section formed in the upper end surface of the support section 50 and into the annular groove section formed in the movable member 35, and generates an upward urging force for the movable member 35 along the axis line X. The spring 36 is provided so as to apply an urging force to the movable member 35 to be coupled to the male screw 33a of the rotary member 33 and reduce a positioning error of the diaphragm integrated valve body 10 due to backlash.

The position detection section 37 is fixed to the motor support member 60 and detects the position of the movable member 35 in the direction of the axis line X. The control board 90, which is described later, can recognize the position of the movable member 35 in the direction of the axial line X that is estimated from the pulse signal transmitted to the stepping motor 31, as well as the position of the movable member 35 in the direction of the axis line X that is detected by the position detection section 37. When these positions do not match, the control board 90 can recognize an occurrence of a malfunction such as a loss of synchronization of the stepping motor 31.

The transfer mechanism 30 having the structure as described above operates in the following manner to cause the diaphragm integrated valve body 10 to move along the axis line X.

The transfer mechanism 30 causes the stepping motor 31 to rotate the drive shaft 32 and the rotary member 33 coupled to the drive shaft 32 about the axis line X. The rotation about the axis line X of the movable member 35 which is provided with the female screw 35c to be coupled to the male screw 33a formed on the outer peripheral surface of the rotary member 33 is regulated by the rotation preventing member. Accordingly, along with the rotation of the rotary member 33 about the axis line X, the movable member 35 moves upward or downward along the axis line X depending on the rotation direction. Further, since the diaphragm integrated valve body 10 is coupled to the movable member 35, the diaphragm integrated valve body 10 moves upward or downward along the axis line X along with the movement of the movable member 35.

The fixing member 40 is a member that is formed in a plate shape about the axis line X and fixes the diaphragm integrated valve body 10 that is attached to the main body section 20. The fixing member 40 is provided with an insertion hole that is opened about the axis line X. The movable member 35 of the transfer mechanism 30 can be inserted into the insertion hole.

The support section 50 supports the movable member 35 of the transfer mechanism 30 in such a manner that the movable member 35 can move along the axis line X. The support section 50 includes a first support member 51 which has a tubular shape and is disposed in proximity to the outer peripheral surface of the movable member 35, and a second support member 52 which is disposed on the outer periphery of the first support member 51.

The first support member 51 includes an inner peripheral surface which has an inner diameter larger than the outer diameter of the movable member 35 and is disposed at a position in proximity to the movable member 35. A difference between the outer diameter of the movable member 35 and the inner diameter of the first support member 51 is set to a minimum possible value with which the movable member 35 can smoothly move along the axis line X.

The inner peripheral surface of the first support member 51 has a cylindrical shape extending within a certain range along the axis line X. When the transfer mechanism 30 causes the diaphragm integrated valve body 10 to move along the axis line X, the first support member 51 regulates the diaphragm integrated valve body 10 from being deviated in the horizontal direction orthogonal to the axis line X. The first support member 51 is desirably formed of a material having hardness lower than that of the movable member 35 so as to suppress a frictional force generated when the first support member 51 contacts the movable member 35. The first support member 51 is preferably formed of, for example, brass which is an alloy of copper and zinc.

As shown in FIG. 2, the first support member 51 is provided with a ventilation groove 51a that communicates with the space R2, and the second support member 52 is provided with a ventilation hole 52a that communicates with the ventilation groove 51a. The ventilation hole 52a is opened to the atmosphere. Accordingly, the space R2 that communicates with each of the ventilation hole 52a and the ventilation groove 51a is maintained at an atmospheric pressure. With this structure, the space R2 that is opposed to the valve chest R1 in which the fluid circulates with the diaphragm section 12 interposed therebetween is maintained in the atmospheric pressure state.

The motor support member 60 is a member that is coupled to the stepping motor 31 with a fastening bolt (not shown). A lower end of the motor support member 60 is supported by the upper surface of the second support member 52, so that the stepping motor 31 is supported in such a manner that the stepping motor 31 is disposed at a constant position from the support section 50.

The rotation preventing pin 70 is a member that is formed in a shaft-like shape so as to regulate the rotation of the annular section 13 of the diaphragm integrated valve body 10 about the axis line X so as to prevent the annular section 13 from being rotated. As shown in FIG. 2, an insertion hole 25 into which a lower end of the rotation preventing pin 70 is inserted is formed in the upper surface of the main body section 20. A notch hole 13b into which the rotation preventing pin 70 is inserted is formed in the outer peripheral surface of the annular section 13. A through-hole 40a into which the rotation preventing pin 70 is inserted is formed in the fixing member 40. The rotation preventing pin 70 is inserted into each of the through-hole 40a, the notch hole 13b, and the insertion hole 25, thereby regulating the rotation of the annular section 13 of the diaphragm integrated valve body 10 about the axis line X so as to prevent the annular section 13 from being rotated.

The base section 80 is a member installed on the installation surface S, and is fixed to the installation surface S with, for example, a fastening bolt (not shown).

As shown in FIG. 1, a fastening bolt 81 and a fastening bolt 82 are fastened from the lower side of the base section 80, so that the main body section 20, the fixing member 40, the support section 50, the motor support member 60, and the base section 80 are integrally formed.

The control board 90 is connected to an external device (not shown) via the cable 200. The control board 90 is supplied with power from the external device via the cable 200, and transmits various signals to the external device and receives various signals therefrom. Examples of the signals received from the external device include a signal indicating a set value of a target flow rate adjusted by the flow rate adjustment device 100.

When the control board 90 receives the signal indicating the set value of the target flow rate, the control board 90 generates a pulse signal for causing the stepping motor 31 to rotate to move the diaphragm integrated valve body 10 to a desired position, and transmits the pulse signal to the stepping motor 31.

Figure 3:
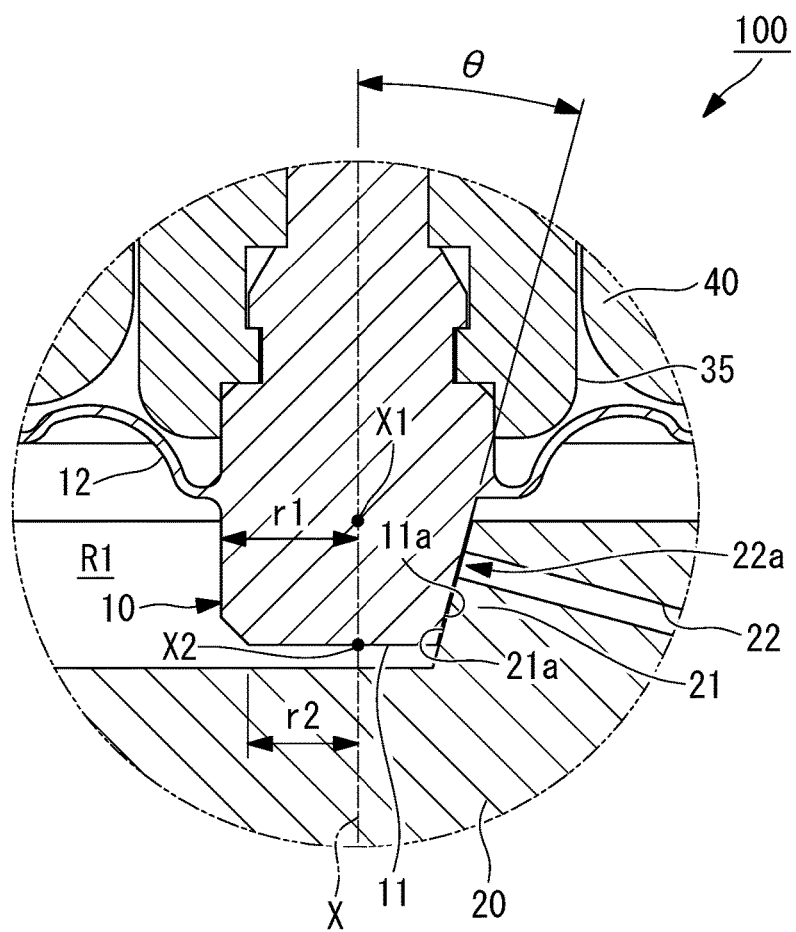
FIG. 3 is a partial enlarged view showing a part II of the flow rate adjustment device shown in FIG. 2.
Figure 4:
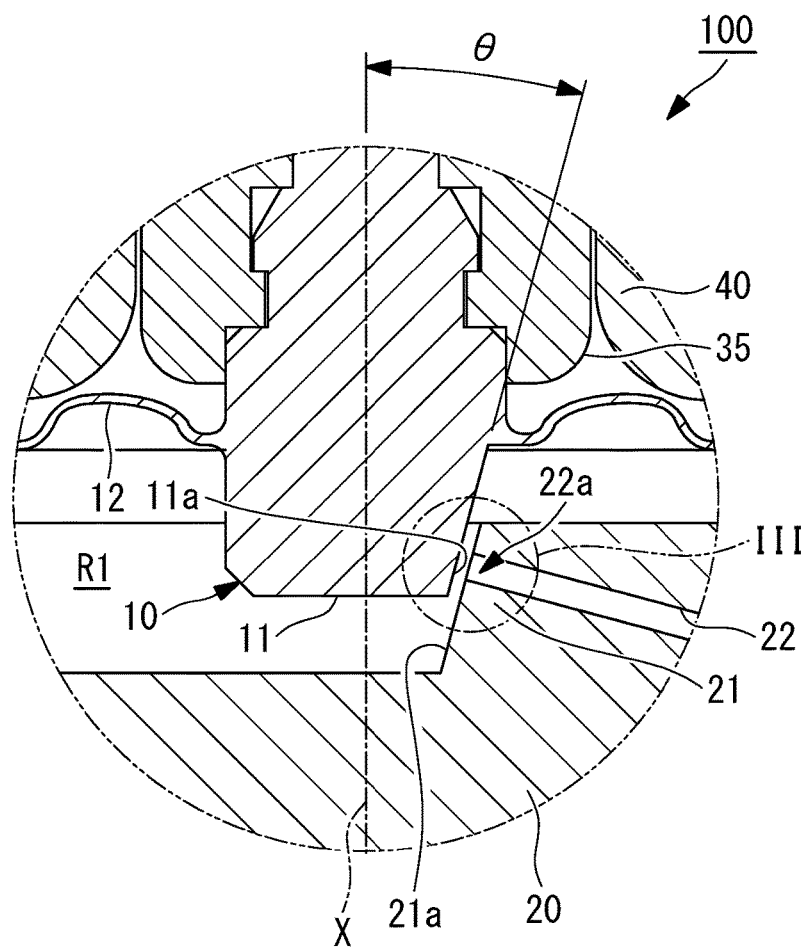
FIG. 4 is a partial enlarged view showing the part II of the flow rate adjustment device shown in FIG. 2.

Referring next to FIGS. 3 and 4, a structure for adjusting the flow rate of the fluid by the diaphragm integrated valve body 10 included in the flow rate adjustment device 100 of this embodiment will be described.

FIGS. 3 and 4 are partial enlarged views showing a part II of the flow rate adjustment device 100 shown in FIG. 2. FIG. 3 shows a state in which the flow rate of the fluid flowing into the valve chest R1 from the introduction flow path 22 is set to a minimum value. On the other hand, FIG. 4 shows a state in which the flow rate of the fluid flowing into the valve chest R1 from the introduction flow path 22 is set to a value greater than the minimum value.

As shown in FIGS. 3 and 4, the diaphragm integrated valve body 10 includes a valve surface 11a which is formed in a planar shape. The valve seat section 21 of the main body section 20 includes a valve seat surface 21a which is disposed at a position facing the valve surface 11a and formed in a planar shape. The valve seat surface 21a is provided around an inflow opening (flow path opening) 22a that allows the valve chest R1 and the introduction flow path 22 to communicate with each other. The transfer mechanism 30 causes the diaphragm integrated valve body 10 to vertically move along the axis line X, thereby adjusting the distance between the valve surface 11a and the valve seat surface 21a.

As shown in FIGS. 3 and 4, the valve surface 11a and the valve seat surface 21a forms an angle θ with the axis line X and are disposed in parallel.

Figure 5:
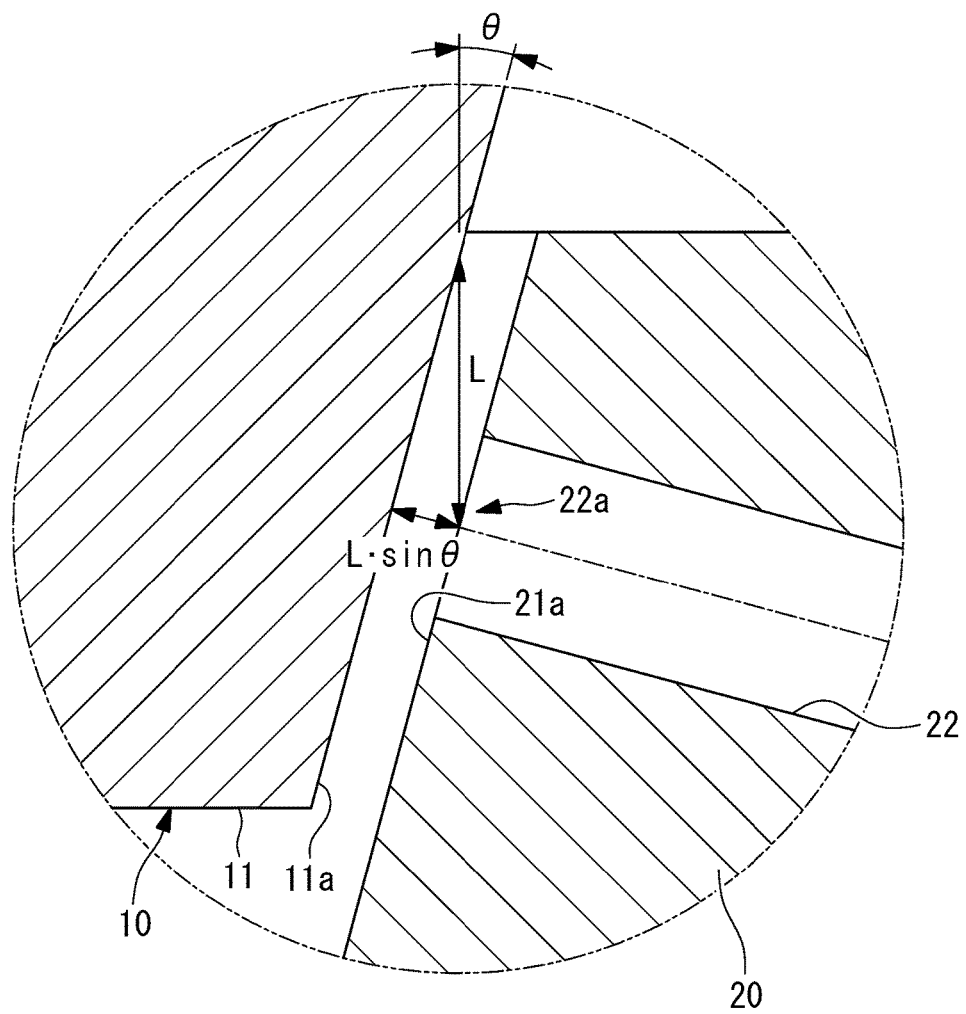
FIG. 5 is a partial enlarged view showing a part III of the flow rate adjustment device shown in FIG. 4.

Referring now to FIG. 5, the relationship between the amount of movement of the diaphragm integrated valve body 10 along the axis line X and the distance between the valve surface 11a and the valve seat surface 21a. FIG. 5 is a partial enlarged view showing a part III of the flow rate adjustment device 100 shown in FIG. 4. Assume that the position of the diaphragm integrated valve body 10 on the axis line X shown in FIG. 4 is moved upward by a distance L from the position of the diaphragm integrated valve body 10 on the axis line X shown in FIG. 3.

As shown in FIG. 5, when the diaphragm integrated valve body 10 is moved upward along the axis line X by the distance L, an increase in the distance between the valve surface 11a and the valve seat surface 21a is represented by L·sin θ. This is because, as shown in FIGS. 3 and 4, the valve surface 11a and the valve seat surface 21a are disposed so as to form the angle θ with the axis line X.

Thus, when the diaphragm integrated valve body 10 is moved upward along the axis line X by the distance L, an increase in the distance between the valve surface 11a and the valve seat surface 21a is represented by L·sin θ which is shorter than the distance L. For example, when the amount of movement of the diaphragm integrated valve body 10 along the axis line X during rotation of the stepping motor 31 by one cycle of the pulse signal corresponds to the distance L, an increase in the distance between the valve surface 11a and the valve seat surface 21a can be represented by L·sin θ which is shorter than the distance L. With this structure, an increase in the distance between the valve surface 11a and the valve seat surface 21a can be reduced to be smaller than the minimum movement amount by the rotation of the stepping motor 31, and thus the flow rate of the fluid can be adjusted with high resolution.

In this case, the angle θ is preferably an acute angle that is larger than 0° and smaller than 90°. More preferably, the angle θ is set to a value in a range from 5° to 45°. Still more preferably, the angle θ is set to a value in a range from 10° to 25°. Most preferably, the angle θ is set to 15°.

Figure 6:
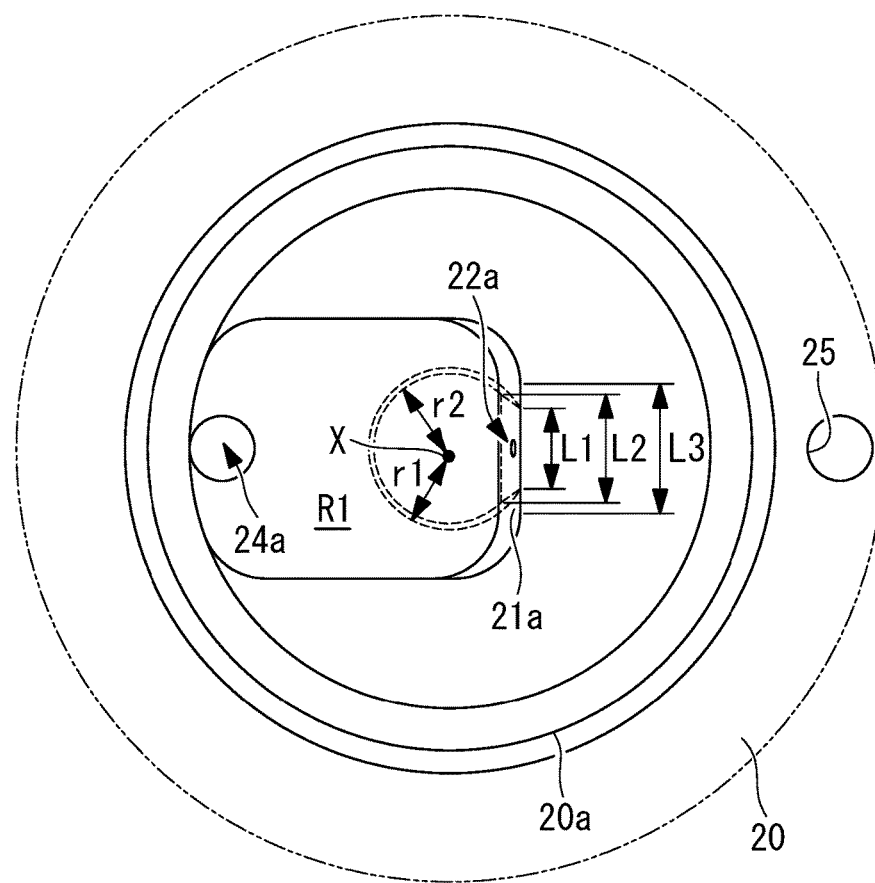
FIG. 6 is a plan view showing a valve chest of a main body section of the flow rate adjustment device according to the first embodiment as viewed from the top along an axis line.

Referring next to FIG. 6, a structure for suppressing a malfunction that when an assembly error occurs in the diaphragm integrated valve body 10 and the main body section 20, the position of the valve surface 11a varies due to the error and the valve surface 11a contacts a section other than the valve seat surface 21a will be described.

FIG. 6 is a plan view showing the valve chest R1 of the main body section 20 of the flow rate adjustment device 100 of this embodiment as viewed from the top along the axis line X.

Dashed lines shown in FIG. 6 respectively indicate the contour of the base 11 on a plane passing through a position X1 (see FIG. 3) on the axis line X and the contour of the base 11 on a plane passing through a position X2 (see FIG. 3) on the axis line X.

Referring to FIG. 6, a dashed line that connects a partial circle having a radius r1 about the axis line X and a straight line representing a distance L1 indicates the contour of the base 11 on the plane passing through the position X1 (see FIG. 3) on the axis line X. Referring to FIG. 6, a dashed line that connects a partial circle having a radius r2 about the axis line X and a straight line representing a distance L2 indicates the contour of the base 11 on the plane passing through the position X2 (see FIG. 3) on the axis line X.

The distance L1 is a length of a line of intersection between a plane orthogonal to the axis line X at the position X1 and the valve surface 11a. The distance L2 is a length of a line of intersection between a plane orthogonal to the axis line X at the position X2 and the valve surface 11a. The distance L2 is set to be longer than the distance L1. This is because the valve surface 11a forms the angle θ, which is an acute angle, with the axis line X.

Note that the length of the line of intersection between the plane orthogonal to the axis line X and the valve surface 11a gradually increases from the position X1 toward the position X2 so as to approach the distance L2 from the distance L1.

On the other hand, a distance L3 is a length of a line of intersection between the plane orthogonal to the axis line X at the position X1 and the valve seat surface 21a. In this case, the valve seat surface 21a corresponds to a part that is disposed at a position facing the valve surface 11a and formed in a planar shape. As shown in FIG. 6, the distance L3 is longer than the distance L1 and the distance L2.

The distance L3 is set to be longer than the distance L1 and the distance L2. This is intended to suppress a malfunction that when an assembly error occurs in the diaphragm integrated valve body 10 and the main body section 20, the position of the valve surface 11a varies due to the error and the valve surface 11a contacts a section other than the valve seat surface 21a.

The operation and advantageous effects of the flow rate adjustment device 100 of this embodiment described above will be described.

According to the flow rate adjustment device 100 of this embodiment, the transfer mechanism 30 adjusts the distance between the valve surface 11a of the diaphragm integrated valve body 10 and the valve seat surface 21a of the valve seat section 21 along the axis line X, thereby adjusting the flow rate of the fluid. Since the valve surface 11a disposed so as to face the valve seat surface 21a has a planar shape, even when an assembly error or a dimension error occurs in the diaphragm integrated valve body 10 and the main body section 20, the valve surface 11a is not inserted into the inflow opening 22a, but instead is disposed in proximity to the valve seat surface 21a which is provided around the inflow opening 22a. Further, the state in which the valve surface and the valve seat surface each having a planar shape are disposed in parallel is maintained. Accordingly, the generation of particles when an assembly error or a dimension error occurs in the diaphragm integrated valve body 10 and the valve seat section 21 can be suppressed.

According to the flow rate adjustment device 100 of this embodiment, the valve surface 11a and the valve seat surface 21a form an acute angle with the axis line X and are disposed in parallel. Accordingly, a variation in the distance between the valve surface 11a and the valve seat surface 21a is relatively smaller than a variation in the distance of movement of the diaphragm integrated valve body 10 along the axis line X by the transfer mechanism 30. Thus, a minimum movement amount of the distance between the valve surface 11a and the valve seat surface 21a is smaller than a minimum movement amount that can be adjusted by the transfer mechanism 30, so that the flow rate of the fluid can be accurately adjusted.

According to the flow rate adjustment device 100 of this embodiment, the length L3 of the line of intersection between the plane orthogonal to the axis line X and the valve seat surface 21a is longer than the lengths L1 and L2 of the line of intersection between the plane and the valve surface 11a.

This structure makes it possible to suppress a malfunction that when an assembly error occurs in the diaphragm integrated valve body 10 and the main body section 20, the position of the valve surface 11a varies due to the error and the valve surface 11a contacts a section other than the valve seat surface 21a.

According to the flow rate adjustment device 100 of this embodiment, the diaphragm integrated valve body 10 includes: the base 11 including the valve surface 11a; the diaphragm section 12 coupled to the outer peripheral surface of the base 11; and the annular section 13 including the inner peripheral surface coupled to the diaphragm section 12. The annular section 13 is regulated in such a manner that the annular section 13 is prevented from being rotated about the axis line X by the rotation preventing pin 70 which is inserted into the main body section 20.

With this structure, the rotational position about the line X of the annular section 13 and the rotational position about the axis line X of the valve seat section 21 are accurately regulated so that the rotational positions have a desired positional relationship. Accordingly, the rotational position about the axis line X of the valve surface 11a of the base 11 coupled to the annular section 13 through the diaphragm section 12 is accurately regulated so that the rotational position is set at a desired position, thereby accurately achieving the state in which the valve surface 11a and the valve seat surface 21a are disposed in parallel.

Second Embodiment

Next, a flow rate adjustment device 100A according to a second embodiment of the present disclosure will be described with reference to the drawings.

The second embodiment is a modified example of the first embodiment and is similar to the first embodiment unless otherwise specified below.

In the flow rate adjustment device 100 of the first embodiment, the upper half of the base 11, which is made of fluorine resin, is inserted into the insertion hole 35a provided at the lower end of the movable member 35, which is made of fluorine resin, so that the diaphragm integrated valve body 10 and the movable member 35 are coupled together.

On the other hand, the flow rate adjustment device 100A of this embodiment couples a diaphragm integrated valve body 10A to a movable member 35A through a shaft-like member 11b that is formed of a material having hardness higher than that of a fluorine resin material.

Figure 7:
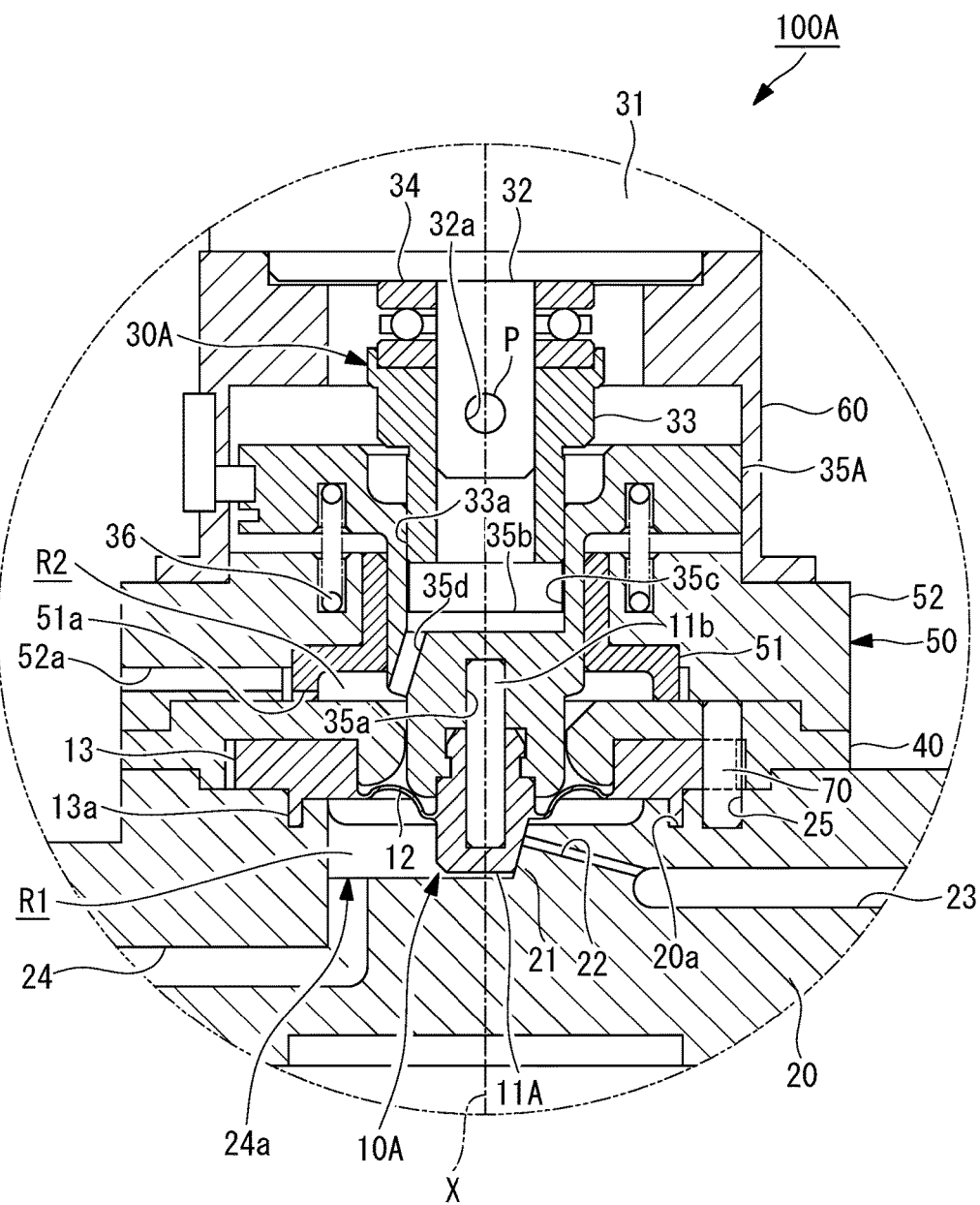
FIG. 7 is a partial enlarged view showing a flow rate adjustment device according to a second embodiment.

As shown in FIG. 7, the insertion hole 35a which is provided at a lower end of the movable member 35A included in the transfer mechanism 30A and a hole formed in a central part of a base 11A of the diaphragm integrated valve body 10A are coupled through the shaft-like member 11b extending along the axis line X.

In this case, the diaphragm integrated valve body 10A is formed of a fluorine resin material such as PTFE. On the other hand, the shaft-like member 11b is formed of a material having hardness higher than that of the fluorine resin material, such as a metallic material such as stainless steel, silicon carbide (SiC), or a ceramic material.

With this structure, the diaphragm integrated valve body 10A can be formed of a fluorine resin material having a high chemical resistance and prevents the diaphragm integrated valve body 10A from being deviated in the horizontal direction orthogonal to the axis line X when the diaphragm integrated valve body 10A contacts the valve seat section 21.

Third Embodiment

Next, a flow rate adjustment device 100B according to a third embodiment of the present disclosure will be described with reference to the drawings.

The third embodiment is a modified example of the first embodiment and is similar to the first embodiment unless otherwise specified below.

In the flow rate adjustment device 100 of the first embodiment, the valve surface 11a and the valve seat surface 21a are each formed in a planar shape.

On the other hand, in the flow rate adjustment device 100B of this embodiment, a valve surface 11Ba and a valve seat surface 21Ba are each formed in a shape matching a conical surface with the axis line X as a center axis.

Figure 8:
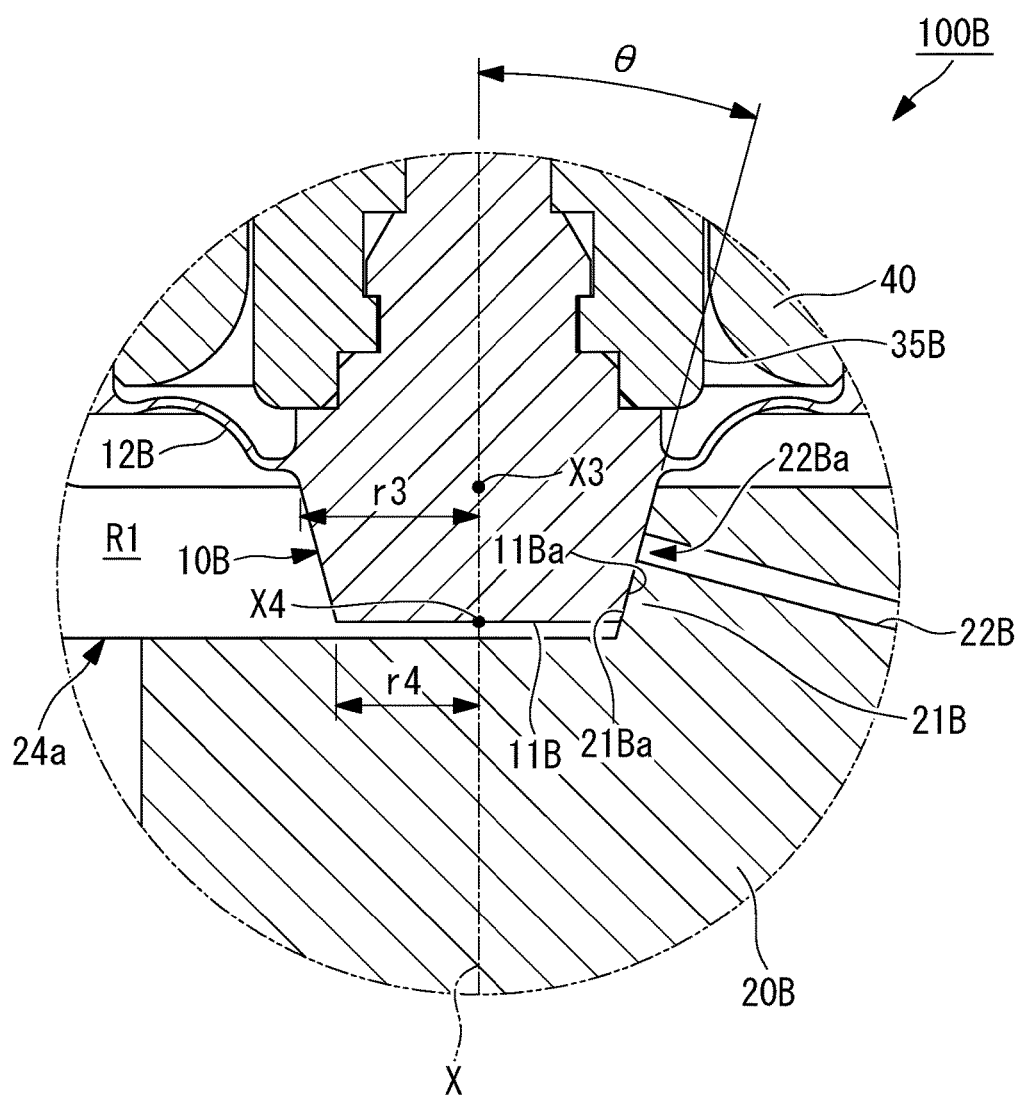
FIG. 8 is a partial enlarged view showing a flow rate adjustment device according to a third embodiment.
Figure 9:
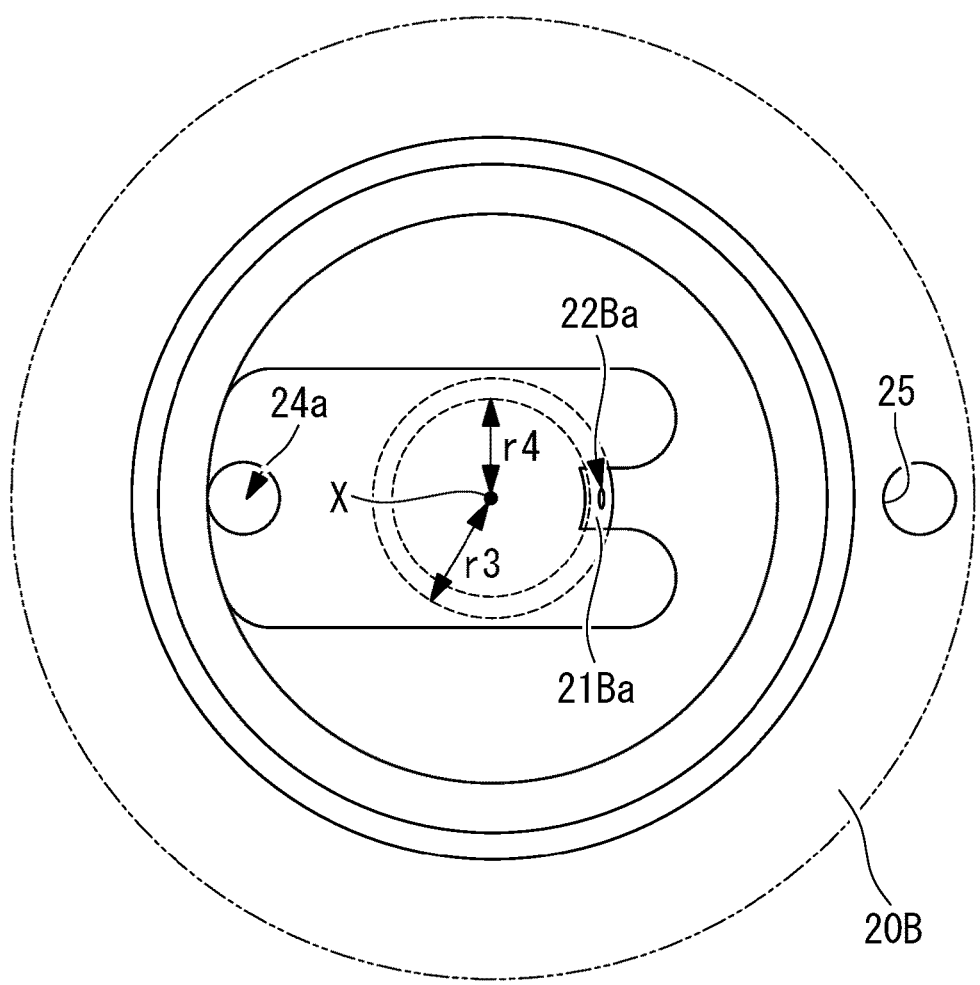
FIG. 9 is a plan view of a valve chest of a main body section of the flow rate adjustment device according to the third embodiment as viewed from the top along an axis line.

Referring to FIGS. 8 and 9, a structure for suppressing a malfunction that when an assembly error occurs in a diaphragm integrated valve body 10B and a main body section 20B, the position of the valve surface 11Ba varies due to the error and the valve surface 11Ba contacts a section other than the valve seat surface 21Ba will be described.

FIG. 8 is a partial enlarged view showing the flow rate adjustment device 100B of this embodiment. FIG. 9 is a plan view showing the valve chest R1 of the main body section 20B of the flow rate adjustment device 100B of this embodiment as viewed from the top along the axis line X.

The diaphragm integrated valve body 10B of this embodiment includes a base 11B which is formed in a shaft-like shape along the axis line X, and a diaphragm section 12B which is coupled to the outer peripheral surface of the base 11B and is formed in an annular shape about the axis line X and in a thin film shape.

As shown in FIG. 8, the flow rate adjustment device 100B of this embodiment causes the base 11B of the diaphragm integrated valve body 10B to vertically move along the axis line X to adjust the distance between the valve surface 11Ba provided on the base 11B and the valve seat surface 21Ba provided on the valve seat section 21B, thereby adjusting the flow rate of the fluid flowing into the valve chest R1 from an introduction flow path 22B through an inflow opening 22Ba.

Dashed lines shown in FIG. 9 respectively indicate the contour of the base 11B on a plane passing through a position X3 (see FIG. 8) on the axis line X and the contour of the base 11B on a plane passing through a position X4 (see FIG. 8) on the axis line X.

In FIG. 9, a dashed line representing a circle with a radius r3 about the axis line X indicates the contour of the base 11B on a plane passing through the position X3 on the axis line X. Further, in FIG. 9, a dashed line representing a circle with a radius r4 about the axis line X indicates the contour of the base 11B on a plane passing through the position X4 on the axis line X.

As shown in FIGS. 8 and 9, a lower end of the base 11B is formed in a circular truncated cone shape which has the radius r3 at the position X3 and has the radius r4, which is smaller than the radius r3, at the position X4. Accordingly, the valve surface 11Ba disposed at a position facing the valve seat surface 21Ba is formed in a shape matching a conical surface with the axis line X as a center axis. Similarly, the valve seat surface 21Ba disposed at a position facing the valve surface 11Ba is formed in a shape matching a conical surface with the axis line X as a center axis.

The valve surface 11Ba and the valve seat surface 21Ba are formed with substantially the same shape so that the surfaces are disposed in proximity to each other without contacting each other, when the flow rate of the fluid flowing into the valve chest R1 through the inflow opening 22Ba is set to the minimum flow rate.

With this structure, even when an error occurs in the rotational position about the axis line X of the valve seat section 21B and the rotational position about the axis line X of the diaphragm integrated valve body 10B, the state in which the conical surfaces face each other can be maintained and the state in which the distance between the valve surface 11Ba and the valve seat surface 21Ba is constant can be maintained.

Other Embodiments

The structure in which, like in the second embodiment, the diaphragm integrated valve body 10A and the movable member 35A, which are formed of a fluorine resin material, are coupled by the shaft-like member 11b that is formed of a material having hardness higher than the fluorine resin material may be employed for the flow rate adjustment device 100B of the third embodiment.

Specifically, the structure in which the diaphragm integrated valve body 10B and the movable member 35B, which are formed of a fluorine resin material, are coupled by a shaft-like member (not shown) that is formed of a material having hardness higher than that of the fluorine resin material may be employed.

The invention claimed is:

1. A flow rate adjustment device that adjusts a flow rate of a fluid circulating through an internal flow path, the flow rate adjustment device comprising:
    a valve body section configured to move along an axis line within a valve chest and including a base, the base having a bottom surface facing a bottom surface of the valve chest and a valve surface formed around the axis line;
    a valve seat section including a valve seat surface disposed at a position facing the valve surface; and
    a transfer mechanism coupled to the valve body section and configured to cause the valve body section to move along the axis line to adjust a distance between the valve surface and the valve seat surface,
    wherein a flow path opening is provided on the valve seat surface, the flow path opening allowing the valve chest and the internal flow path to communicate with each other,
    wherein the valve surface and the valve seat surface form an acute angle with the axis line and are disposed in parallel,
    wherein the valve surface and the valve seat surface are surfaces formed in a planar shape, and
    wherein the internal flow path extends from the flow path opening provided on the valve seat surface in a direction that inclines relative to the axis line.

2. The flow rate adjustment device according to claim 1, wherein, a length (L3) of a line of intersection between a plane orthogonal to the axis line and the valve seat surface is longer than a length (L1) of a line of intersection between the plane orthogonal to the axis line and the valve surface.

3. The flow rate adjustment device according to claim 1, wherein
    the valve body section and the transfer mechanism are coupled through a shaft-like member extending along the axis line,
    the valve body section is formed of a fluorine resin material, and
    the shaft-like member is formed of a material having hardness higher than that of the fluorine resin material.

4. The flow rate adjustment device according to claim 1, wherein
    the valve body section includes: a thin film section coupled to an outer peripheral surface of the base and formed in an annular shape about the axis line; and an annular section including an inner peripheral surface coupled to the thin film section and formed in an annular shape,
    the valve seat section is provided in a main body section having the internal flow path formed therein, and
    the annular section is regulated in such a manner that the annular section is prevented from being rotated about the axis line by a rotation preventing member inserted in the main body section.

5. The flow rate adjustment device according to claim 1, wherein the valve surface is formed on a side surface of the base and the valve seat surface faces the valve surface.

6. The flow rate adjustment device according to claim 1, wherein the valve surface is not formed on the bottom surface of the base.

* * * * *